United States Patent [19]

Treadwell et al.

[11] Patent Number: 4,932,276
[45] Date of Patent: Jun. 12, 1990

[54] FLUID OPERATED ROTOSLIDE

[75] Inventors: Donald R. Treadwell; Boris Dushine, both of San Jose, Calif.

[73] Assignee: Rotoslide Co., San Jose, Calif.

[21] Appl. No.: 231,135

[22] Filed: Aug. 11, 1988

[51] Int. Cl.⁵ .............................................. F16H 19/04
[52] U.S. Cl. .......................................... 74/29; 74/30; 74/89.17; 74/110; 74/422
[58] Field of Search ................... 74/29, 30, 89.17, 110, 74/422

[56] References Cited

U.S. PATENT DOCUMENTS

| | | | |
|---|---|---|---|
| 1,567,172 | 12/1925 | Powell | 74/29 |
| 2,842,972 | 7/1958 | Houdart | 74/422 |
| 2,844,127 | 7/1958 | Steiner | 74/89.17 |
| 2,859,630 | 11/1958 | Hatch | 74/89.17 |
| 4,392,631 | 7/1983 | DeWald | 74/110 |
| 4,541,293 | 9/1985 | Caugant et al. | 74/422 |

FOREIGN PATENT DOCUMENTS

| | | | |
|---|---|---|---|
| 197223 | 4/1958 | Austria | 74/89.17 |
| 850350 | 9/1970 | Canada | 74/29 |
| 2320486 | 3/1977 | France | 74/422 |
| 59-133861 | 8/1984 | Japan | 74/89.17 |
| 61-197851 | 9/1986 | Japan | 74/29 |

*Primary Examiner*—Leslie A. Braun
*Assistant Examiner*—Scott Anchell
*Attorney, Agent, or Firm*—John J. Leavitt

[57] ABSTRACT

Presented is a fluid-operated control device that may be operated by pressurized gas or liquid. A housing contains a double-acting piston assembly that is moveable in a longitudinal bore in the housing. A gear rack connects the two pistons. A rotor assembly in the housing includes a pinion gear meshing with the gear rack, and a second pinion gear meshes with a second gear rack attached to a slide member moveably supported on the housing. Thus, injection of fluid under pressure behind one or the other of the pistons causes axial translation of the pistons and connecting gear rack. Translation of the gear rack effects rotation of the rotor assembly, which in turn effects axial translation of the second gear rack to which is attached the slide member.

14 Claims, 4 Drawing Sheets

FIG_1
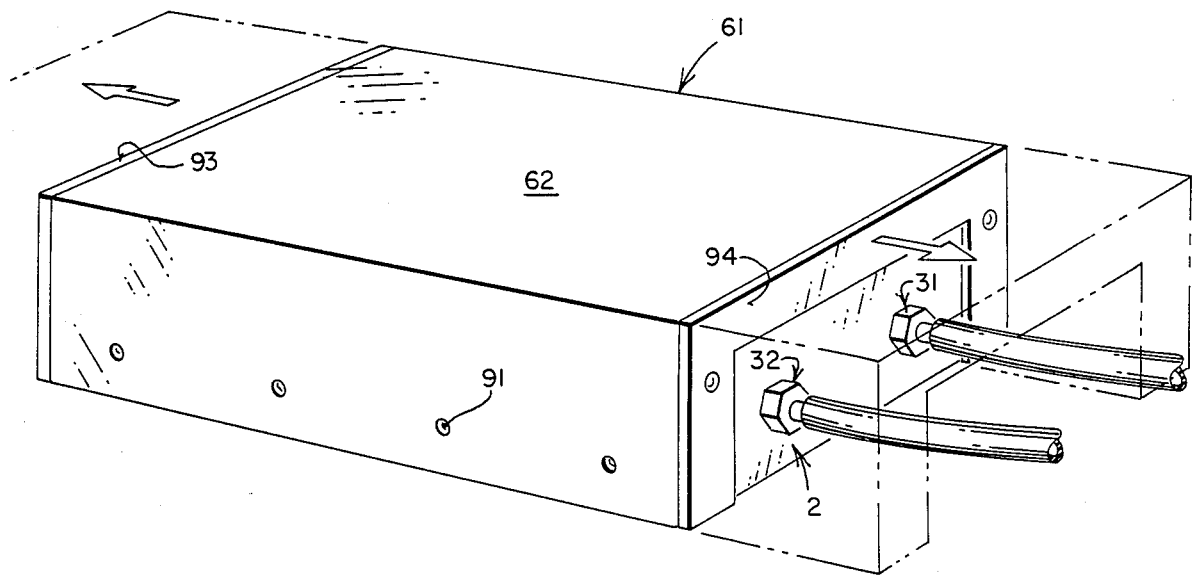
FIG_2
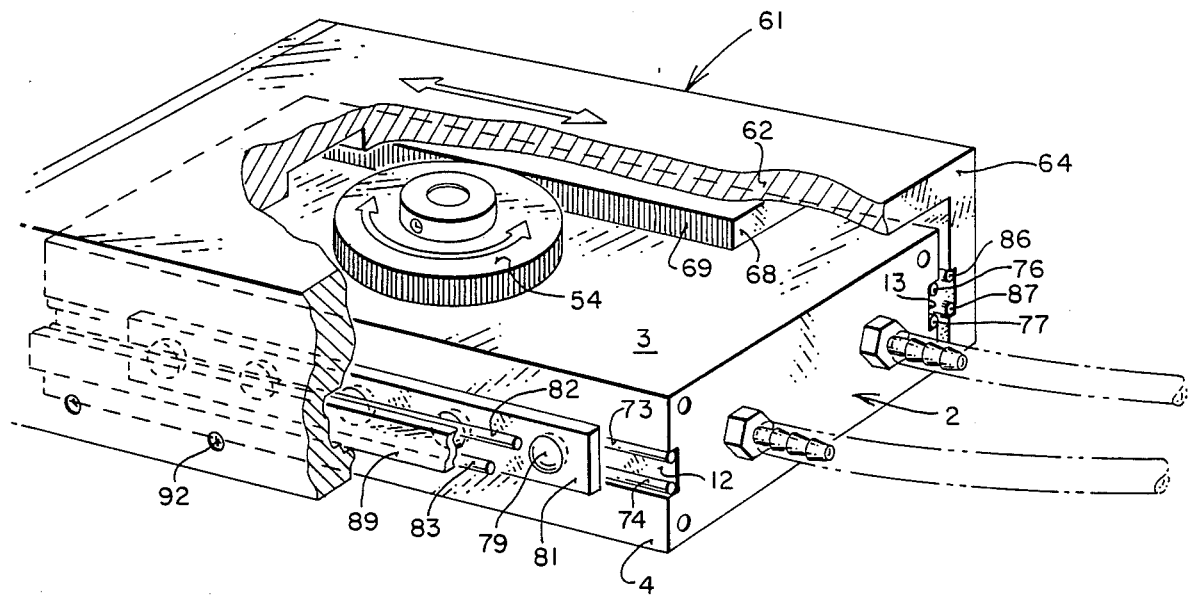

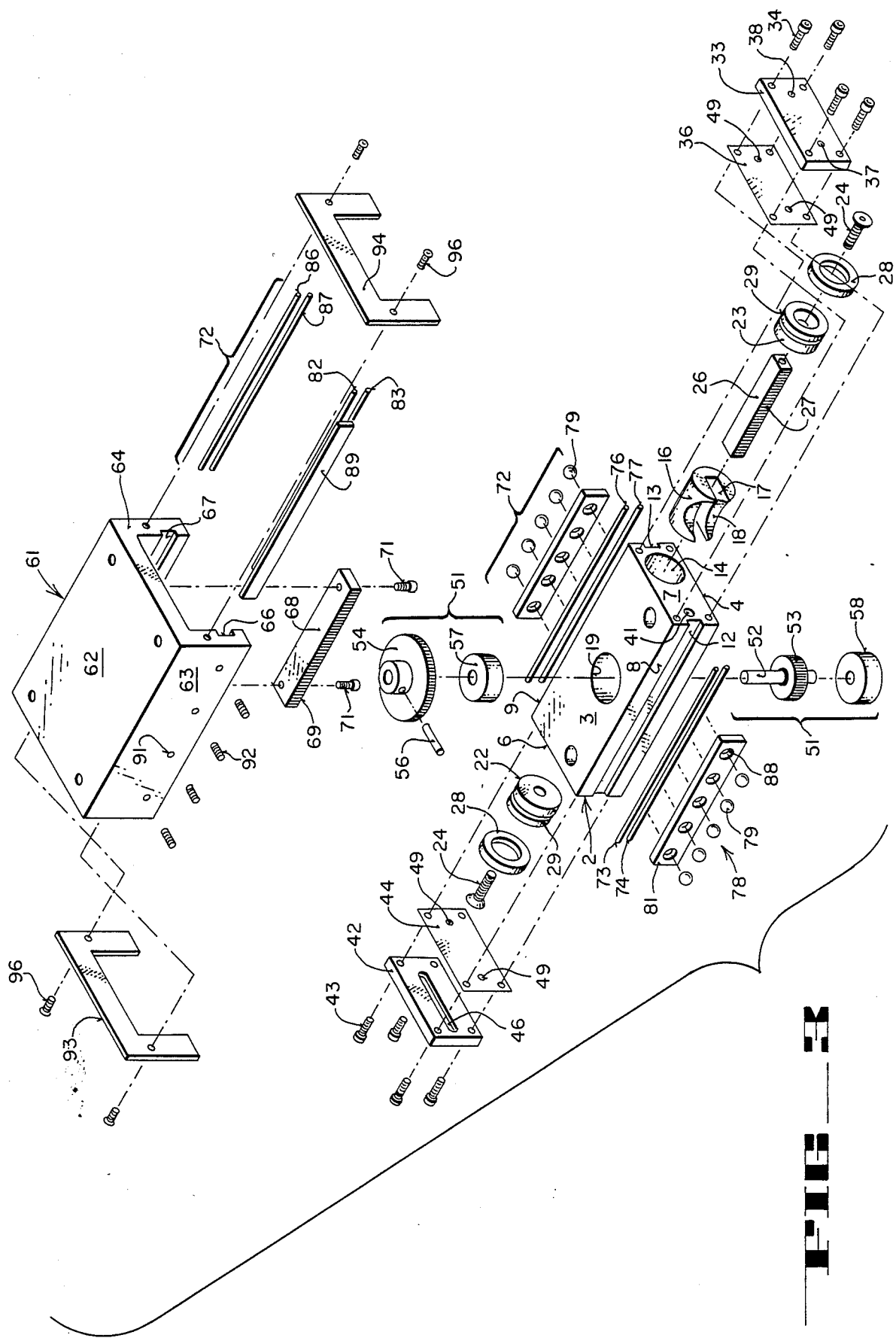

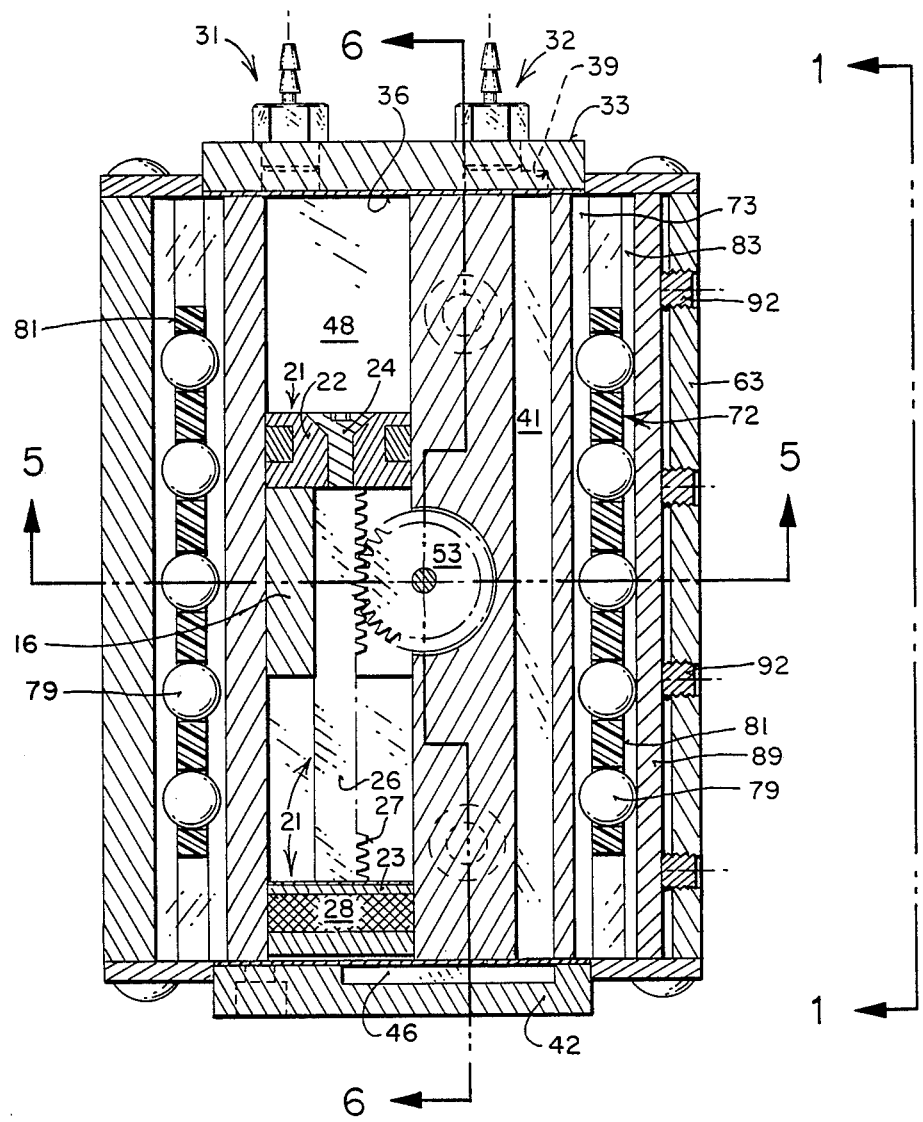
FIG_4
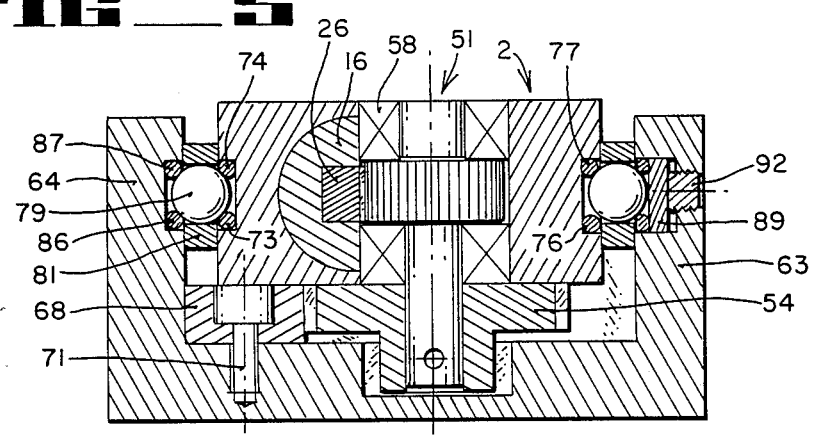
FIG_5

FIG_6
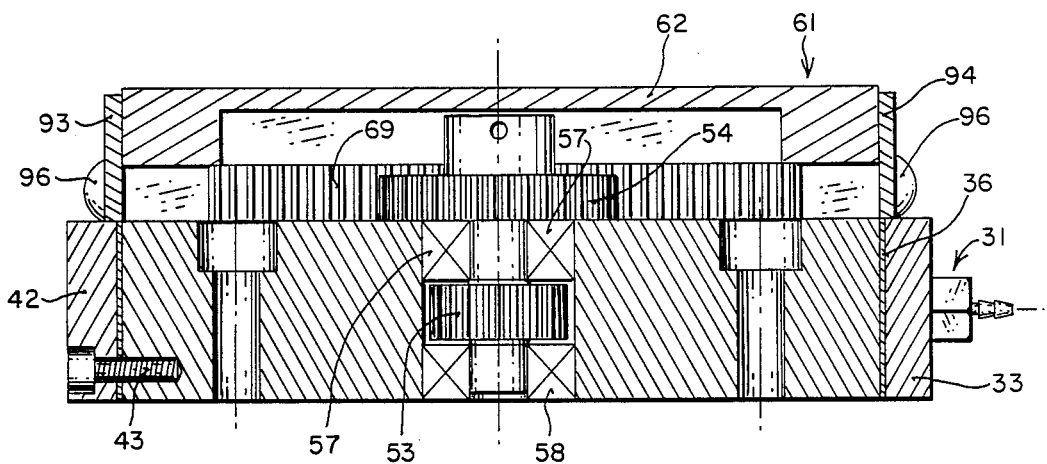
FIG_7
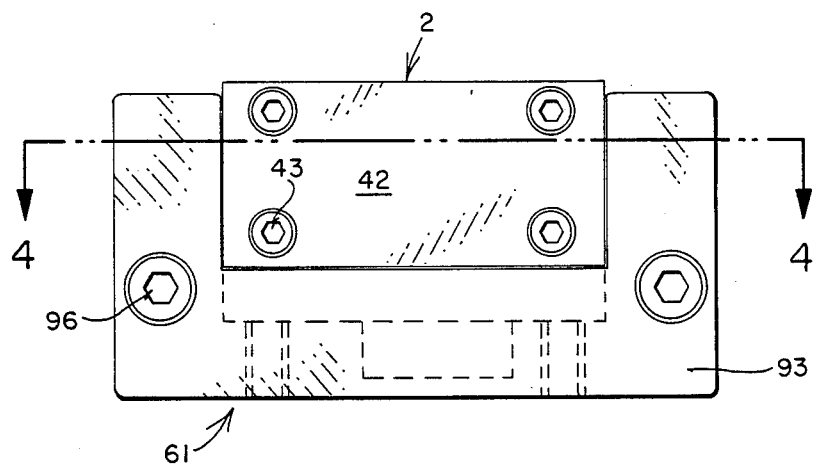

FLUID OPERATED ROTOSLIDE

BACKGROUND OF THE INVENTION

1. Field of the Invention.

This invention relates to control devices, and particularly to a control device that translates axial movement of a member into rotary movement of an associated member, with axial movement being effected with fluid pressure.

2. Description of the Prior Art.

The prior art related to the subject matter of the invention disclosed herein is believed to be found in Class 74, sub-classes 109, 110 and 422. A search in this area has revealed the existence of the following U.S. Pat. Nos.:

| | | |
|---|---|---|
| 2,842,972 | 2,857,628 | 2,885,902 |
| 2,958,263 | 3,349,927 | 3,524,436 |
| 3,525,102 | 3,786,938 | 3,848,759 |
| 4,392,631 | 4,520,994 | 4,561,592 |
| 4,541,293 | 4,662,557 | |

The structures disclosed in the patents listed above without exception are dissimilar from the structure disclosed and claimed herein. The prior art is replete with patents that utilize many different methods and structures for translating motion in one direction to a different type of motion in an opposite or transverse direction, or even translating axial motion into rotary motion of an associated element. However, we have not found any of these structures to be as simple and economical to manufacture and operate, or to produce the close tolerances of movement that are required in many industries, as is true with the subject matter of this invention.

In many industries, control devices are used to position an element, say a machine element, to perform a given function. Frequently, the movement of such a machine element is controlled in terms of the direction of movement and extent of movement by a computer. Accordingly, one of the important objects of the invention is the provision of a control device that is fluid operated and which accurately transforms linear movemet of one element to rotary movement of an associated element.

Because of the precision that is required to be maintained in the manufacture of many different devices, it is important that control devices associated with a machining function work within very close tolerances and in cooperation with whatever type of tool is used to perform the machining function. Accordingly, another important object of the invention is the provision of a control device in which such close tolerances are inherent from the specialized construction of the control device.

While we have indicated above that a control mechanism such as the one disclosed herein is useful in positioning a tool to effect a machining operation on a work piece, it is also an object of the invention that the control device of this invention be utilized to control the position of a work piece in relation to a stationary machine tool. Thus, it is contemplated that in one aspect of this invention, a work piece may be mounted directly on the control device, and the work piece moved from one location to another by operation of the control device, whereupon a predetermined operation may be performed on the work piece in the location to which it is moved.

The invention possesses other objects and features of advantage, some of which, with the foregoing, will be apparent from the following description and the drawings. It is to be understood however, that the invention is not limited to the embodiment illustrated and described, since it may be embodied in various forms within the scope of the appended claims.

SUMMARY OF THE INVENTION

In terms of broad inclusion, the fluid driven control device of the invention includes a housing adapted to be mounted in a stationary manner on a supporting structure in association with appropriate conduits for the circulation of fluids through the housing to actuate a piston therewithin. Mounted on the housing for axial translation in relation thereto is a slide member which moves longitudinally of the housing in concert with the piston in response to the admission of fluid into the housing. The piston assembly within the housing includes a rack that moves axially with the piston, and which interacts with a rotor assembly including a pinion gear caused to rotate by interaction with the rack. The rotor assembly includes a shaft, one end of which is exposed from one surface of the housing. The housing and slide member are moveable relative to each other on a bearing assembly that is disposed between the two members in such a way that very high precision may be maintained of the movement of the slide member in relation to the housing. A second pinion gear mounted on the shaft of the rotor assembly is adapted to engage with a rack mounted on the slide member. Fluid delivery means appropriately connected between a source of such fluid and inlet and outlet ports on the housing admit the circulation of the fluid through the housing to effect axial translation of the piston, and thereby the rack that meshes with the first mentioned pinion gear, with the result that the second pinion gear is also caused to rotate and, since this second pinion gear is in opertive meshing relationship with the second rack mounted on the slide member, the slide member is caused to move axially in relation to the fixed housing.

BRIEF DESCRIPTION OF THE DRAWINGS

FIG. 1 is a perspective view showing the control device mounted for actuation of the slide member.

FIG. 2 is a view similar to FIG. 1, but with the slide member partially broken away to reveal the underlying structure.

FIG. 3 is an exploded view in perspective illustrating the various components of the control device and their interrelationship with associated components.

FIG. 4 is a horizontal sectional view taken in the plane indicated by the line 4—4 of FIG. 7.

FIG. 5 is a horizontal sectional view taken in the plane indicated by the line 5—5 in FIG. 4.

FIG. 6 is a horizontal sectional view taken in the plane indicated by the line 6—6 in FIG. 4.

FIG. 7 is an end elevational view of the control device.

DESCRIPTION OF THE PREFERRED EMBODIMENT

In terms of greater detail, the fluid-driven control device of the invention comprises a housing designated generally by the numeral 2, and which also may be categorized as a base or support member. The housing or support member is conveniently elongated in one dimension, being rectangular in cross section and having opposed flat surfaces 3 and 4, end surfaces 6 and 7, and side surfaces 8 and 9. As illustrated in the exploded view of FIG. 3, it will be seen that the housing member 2 is fabricated from elongated aluminum bar stock having the configuration illustrated, and is formed on the two opposite sides 8 and 9, respectively, with elongated grooves 12 and 13 milled into the surfaces 8 and 9, and extending for the entire length of the housing block for a purpose which will hereinafter be explained.

Formed longitudinally in the housing block 2 is an elongated bore 14 that extends the full length of the housing block, opposite ends of the bore opening on the surfaces 6 and 7 of the housing block as illustrated. The housing block 2 accommodates a bearing block 16 formed from aluminum and having a cylindrical surface corresponding to the configuration of the bore 14, and is sized to be press-fitted into the bore where it occupies a median position midway between the end surfaces 6 and 7. The bearing block 16 is provided with an elongated slot 17 therein that extends the full length of the bearing block 16, and is also provided with a semi-cylindrical notch 18 that faces transversely of the housing block when the bearing block is inserted in the bore 14. The housing block 2 is also provided with a transversely extending bore 19 which extends between the two opposed flat surfaces 3 and 4 as illustrated, with the bore 19 intersecting the bore 14 and removing a portion of the cylindrical surface of the bore 14. However, when the bearing block 16 is press-fitted into the bore 14, the semi-cylindrical notch 18 of the bearing block is positioned to complement the cylindrical surface of the bore 19.

The bore 14 is adapted to slidably receive a piston assembly designated generally by the numeral 21, the piston assembly including a pair of spaced piston heads 22 and 23 each secured by an appropriate screw 24 to the opposite ends of an intervening, rectangular cross-section connecting bar 26 configured to slidably engage the elongated slot 17 in the bearing block 16. One face of the connecting bar 26 is provided with teeth 27, thus forming a gear rack of the connecting bar 26. Each of the pistons 22 and 23 is provided with an appropriate seal means 28, which might be an "O"-ring, or a "quad" ring, each seated in an appropriate groove 29 formed in the cylindrical periphery of each piston as illustrated. Thus, as illustrated in FIGS. 4 and 5, with the piston assembly in assembled form and inserted into the elongated bore 14, the connecting bar 26, on the opposite ends of which the pistons 22 and 23 are mounted, will lie on opposite sides of the bearing block 16, with the connecting bar 26 on which the rack teeth 27 are formed slidably disposed in the bearing block for reciprocal movement, depending upon the manner in which fluid pressure is applied to the pistons. For this purpose, as illustrated in FIG. 4, fluid fittings designated generally by the numerals 31 and 32 are provided mounted on an end plate 33 appropriately bolted to the end surface 7 of the housing block by appropriate screws 34. Note that an appropriate gasket 36 is interposed between the end plate 33 and the end surface 7 of the housing block. As illustrated in FIG. 3, the end plate 33 is provided with apertures 37 and 38 in which the fluid inlet and outlet fittings 31 and 32 are mounted, and the gasket 36 is provided with corresponding apertures that permit the fluid to flow into the housing block. For this purpose, the end plate 33 is provided with a recess 39 (FIG. 4) that communicates with an elongated bore 41 formed in the housing block 2 and which extends the entire length of the housing block and opens on the surfaces 6 and 7.

At the opposite end of the housing block, namely, the end surface 6 of the housing block, there is provided an end plate 42 adapted to be secured to the end face 6 of the housing block by means of appropriate screws 43, with a gasket 44 interposed therebetween to form a fluid tight union between the end plate 42 and the end surface 6 of the housing block. As illustrated in FIG. 3, the end plate 42 is provided with an elongated slot 46 that is adapted to communicate between the fluid passage 41 and the bore 14 so that fluid admitted to the housing block through the fluid fitting 32 may be channeled into the bore 14 of the housing block behind the piston 23, thus causing the piston 23 as viewed in FIG. 4 to be translated up toward the end plate 33 and away from the end plate 42. Obviously, since the fluid system is a closed system, the volume of the bore 14, designated generally by the numeral 48 in FIG. 4, will be full of fluid and as the piston 22 progresses toward the end plate 33, this fluid will be caused to be expressed from the fitting 31. In like manner, when the piston 22 lies at its extreme position against the end plate 33, and movement of the piston assembly occurs in the opposite direction toward the end plate 42, that portion of the bore ahead of the piston 23 is full of fluid which will be expressed through the elongated groove 46 that communicates with the fluid passage 41 and the fluid fitting 32. As illustrated in the drawings, particularly FIG. 3, the gaskets 36 and 44 are both provided with apertures 49 that permit this flow of fluid as herein above described. The piston assembly is therefore a double acting assembly that moves in both directions under the impetus of fluid admitted to the bore 14 behind one or the other of the two pistons 22 or 23.

Mounted on the housing block 2, specifically, mounted in the bore 19 of the housing block, is a rotor assembly designated generally by the numeral 51 and including a rotor shaft 52 on which is mounted a first pinion gear 53 and a second pinion gear 54, both gears being attached to the shaft 52 by appropriate roll pins 56. The rotor assembly is mounted in the bore 19 by appropriate bearings 57 and 58 seen in perspective in FIG. 3, and in cross-section in FIGS. 6 and 6. Preferably, the bearings 57 and 58 are press-fitted into the bore 19 and retain the pinion gear 53 in meshing relationship with the teeth 27 of the connecting bar 26, the gear rack thus formed by the bar 26 and teeth 27 being slidably disposed in the bearing block 16, with the teeth 27 being exposed for meshing relationship with the pinion 53 by virtue of the cylindrical notch 18.

At the opposite end of the shaft 52, the pinion gear 54 lies adjacent the surface 3 of the housing block 2 and of course rotates in the same direction as the pinion gear 53 whenever the gear rack 26–27 is axially translated in the bearing block 16 by displacement of the pistons 22 and 23.

Moveably mounted on the housing block 2 is a slide member designated generally by the numeral 61. The slide member includes a generally U-shaped, or channel-shaped member having a web 62 from which extend perpendicular flanges 63 and 64. The flanges 63 and 64 are provided with longitudinally extending grooves 66 and 67, respectively, formed on the inner mutually facing surfaces of the flanges 63 and 64. Mounted within the channel thus formed by the web 62 and the perpendicular flanges 63 and 64 is an elongated bar 68 having gear teeth 69 formed therein to constitute a gear rack appropriately secured to the web 62 within the channel by appropriate screws 71. The gear rack 68-69 is mounted within the slide member 61 in position to mesh with the teeth of the pinion gear 54. Thus, since the pinion gear 54 is caused to rotate when the pistons 22 and 23 are axially translated within the bore 14, and since the housing block 2 remains stationary, it will be seen that rotation of the pinion gear 54 in conjunction with the rack 68-69 which is attached to the slide member 61, will result in the slide member 61 being translated axially with respect to the housing block 2, and in the same direction as the piston assembly.

To movably support the slide member 61 on the housing block 2, there is provided a bearing assembly designated generally by the numeral 72 and mounted on the housing block 2 and the slide member 61 in conjunction with the elongated slots 12-13 and 66-67. With respect to the housing block 2, and referring to each of the grooves 12 and 13 milled longitudinally in the edge surfaces 8 and 9 of the housing block, there is provided for groove 12 a pair of bearing rods 73 and 74 adapted to lie within the groove 12, specifically, in the opposed corners thereof as shown in FIG. 5. With respect to the groove 13 formed in the housing block 2, the bearing rods 76 and 77 lie against the opposed sides of the groove 13 as also illustrated in FIG. 5. The rods 73-74 and 77-76 are preferably hardened steel rods and are utilized to rollably support the multiple steel ball bearing assemblies designated generally by the numeral 78 and including steel ball bearings 79 mounted in an apertured separator plate 81 configured so that each of the apertures rollably receives one of the steel ball bearings 79, holding the steel ball bearing captured so that the outer periphery thereof makes rolling contact with the cylindrical outer periphery of the associated steel bearing rods 73-74 and 76-77. To reduce friction between the ball bearings 79 and the separator plate 81, the separator plate 81 is preferably fabricated from a self lubricating synthetic resinous material, for example, Nylon. In the interest of brevity in this description, it is noted that with respect to the groove 13 on the opposite side edge 9 of the housing block 2, the same construction is utilized and therefore the same reference numbers are applied to these elements.

Referring to FIG. 3, and specifically to the slide member 61, it will be noted that bearing bars 82 and 83, identical to the bearing bars 73-74, are provided and adapted to be mounted within the groove 66 formed in flange 63 of the slide member 61. In like manner, the bearing bars 86 and 87 are adapted to be seated in the groove 67 formed in the flange 64 of the slide member 61. When the slide member 61 is assembled as illustrated in FIGS. 4 and 5, it will be seen that the bearing rods 86 and 87 lie snugly in the groove 67, making a point contact with the associated steel ball bearings 79, thus minimizing the frictional resistance to rolling between the steel balls 79 and the associated bearing rods 73-74 and 86-87 between which the rollable ball bearing balls 79 are captured. It should be noted that because the inner periphery of the apertures 88 formed in the separator bar 81 are essentially flat in a transverse direction, each of the rollable ball bearing balls 79 makes only minimal contact with these inner peripheral surfaces; thus reducing the frictional resistance to rolling of the ball bearing balls.

Referring again to FIGS. 3 and 5, and specifically to the bearing rods 82 and 83, it will be seen that with respect to the bearing rods 82 and 83 there is associated a stainless steel shim 89 that is interposed between the bottom of the groove 66 and the associated steel bearing rods 82 and 83. Additionally, formed in the flange 63 of the slide member 61, are a plurality of transversely extending bores 91 adapted to receive set screws 92, the inner ends of which are adapted to bear against the associated surface of the shim bar 89, so that adjustment of the set screws 92 may be made to alter the position of the shim bar 89 so that all unessential play may be removed from the bearing assemblies to thereby increase the accuracy of operation of the assembly. This construction is clearly illustrated in FIGS. 4 and 5.

To retain the bearing rod sets 82-83 and 86-87, and the shim bar 89 from longitudinal displacement within the slide member 61, there are provided end plates 93 and 94, each having generally the configuration of the cross section of the channel-shaped slide member 61, and being detachably secured thereto by appropriate screws 96.

It will thus be seen that by the application of an appropriate fluid to the fittings 31 and 32, whether the fluid be gaseous, such as air, or liquid, the piston assembly will be caused to move axially within the bore 14, causing the pinion gears 53 and 54 to rotate by virtue of the interaction between the gear rack 26-27 and the teeth of the pinion 53. Rotation of the rotor assembly, in turn, because of the meshing relationship between the pinion gear 54 and the rack 68-69 fastened to the slide member 61, results in axial displacement of the housing member 61. It is important to note that in the embodiment of the invention disclosed herein, the slide member 61 will be displaced longitudinally in the same direction in which the piston assembly is displaced. Obviously, other arrangements could be made. For example, where appropriate, the slide member could be caused to be displaced in the opposite direction from the direction in which the piston assembly is displaced.

Having thus described the invention, what is believed to be new and novel and sought to be protected by letters patent of the United States is as follows:

We claim:

1. A fluid-driven control device, comprising:
   (a) a monolithic housing block having intersecting first and second bores extending therethrough;
   (b) a piston assembly slidably mounted in said first bore and selectively displaceable between predetermined limits;
   (c) a rotor assembly mounted in said second bore and including first and second rotatable pinion gears;
   (d) a slide member mounted on said monolithic block for movement axially thereon;
   (e) means interposed between said rotor assembly and said slide member operative to effect axial displacement of the slide member in relation to said monolithic housing block when said piston assembly is displaced;
   (f) means on said monolithic housing block for selectively delivering fluid to a selected end of said first bore to effect displacement of said piston assembly;
   (g) said monolithic housing block being elongated and generally rectangular in cross-section to provide parallel opposite side edges; and
   (h) oppositely facing elongated bearing grooves in said opposite side edges thereof.

2. A fluid-driven control device, comprising:
   (a) a monolithic housing block having intersecting first and second bores extending therethrough;

(b) a piston assembly slidably mounted in said first bore and selectively displaceable between predetermined limits;
(c) a rotor assembly mounted in said second bore and including first and second rotatable pinion gears;
(d) a slide member mounted on said monolithic block for movement axially thereon;
(e) means interposed between said rotor assembly and said slide member operative to effect axial displacement of the slide member in relation to said monolithic housing block when said piston assembly is displaced;
(f) means on said monolithic housing block for selectively delivering fluid to a selected end of said first bore to effect displacement of said piston assembly;
(g) said slide member being elongated and generally channel-shaped in cross-section to provide parallel opposite side flanges; and
(h) mutually facing elongated bearing grooves in said opposite side flanges, said monolithic housing block being disposed between said opposite side flanges.

3. A fluid-driven control device, comprising:
(a) a monolithic housing block having intersecting first and second bores extending therethrough;
(b) a piston assembly slidably mounted in said first bore and selectively displaceable between predetermined limits;
(c) a rotor assembly mounted in said second bore and including first and second rotatable pinion gears;
(d) a slide member mounted on said monolithic block for movement axially thereon;
(e) means interposed between said rotor assembly and slide member operative to effect axial displacement of the slide member in relation to said monolithic housing block when said piston assembly is displaced;
(f) means on said monolithic housing block for selectively delivering fluid to a selected end of said first bore to effect displacement of said piston assembly;
(g) a bearing assembly interposed between said monolithic housing block and said slide member; and
(h) said bearing assembly includes a multiplicity of ball bearings rollably disposed between said monolithic housing block and said slide member.

4. A fluid-driven control device, comprising:
(a) a monolithic housing block having intersecting first and second bores extending therethrough;
(b) a piston assembly slidably mounted in said first bore and selectively displaceable between predetermined limits;
(c) a rotor assembly mounted in said second bore and including first and second rotatable pinion gears;
(d) a slide member mounted on said monolithic block for movement axially thereon;
(e) means interposed between said rotor assembly and said slide member operative to effect axial displacement of the slide member in relation to said monolithic housing block when said piston assembly is displaced; and
(f) means on said monolithic housing block for selectively delivering fluid to a selected end of said first bore to effect displacement of said piston assembly;
(g) said slide member being rollably mounted on said monolithic housing block.

5. The combination according to claim 4, in which said means interposed between said rotor assembly and said slide member comprises first and second gear racks meshing, respectively, with said first and second pinion gears.

6. The combination according to claim 5, in which said first gear rack is slidably mounted in said first bore for axial displacement with said piston assembly, and said second gear rack is fixedly mounted on said slide member whereby displacement of said piston assembly by delivery of fluid to said first bore effects rotation of said rotor assembly and axial displacement of said slide member.

7. The combination according to claim 4, in which the fluid delivered to said first bore is air under pressure.

8. The combination according to claim 4, in which a bearing assembly is interposed between said monolithic housing block and said slide member.

9. The combination according to claim 4, in which said piston assembly comprises a double-acting piston assembly including a pair of pistons spaced apart within said first bore on opposite sides of said second bore.

10. The combination according to claim 9, in which said piston assembly includes a piston connector bar extending axially in said first bore and joining said pair of pistons for axial displacement in unison when fluid is delivered to either end of said first bore, and gear rack means on said connector bar meshing with said first pinion gear of said rotor assembly whereby axial displacement of said piston assembly effects rotation of said rotor assembly.

11. The combination according to claims 1, 2, 3 or 4, in which a bearing assembly is interposed between said monolithic housing block and said slide member, said bearing assembly including two sets of ball bearings disposed between opposite side edges of said housing block and associated flanges on said slide member, each said set of ball bearings including an apertured separator plate disposed between said housing block and said slide member whereby the ball bearings of each set are maintained at predetermined intervals and spaced apart along said housing block, and a group of four bearing rods associated with each set of ball bearings and extending longitudinally between said housing block and said slide member with each two of said rods of each group of four rods being mounted on said slide member on one side of said associated separator plate while the other pair of bearing rods of the group of four rods are mounted on said housing block on the opposite side of said associated separator plate whereby said ball bearings make a rolling point contact with said elongated bearing rods.

12. The combination according to claim 11, in which means are provided operatively associated with at least one set of ball bearings selectively adjustable to vary the rolling tolerance of said ball bearings.

13. A fluid-driven control device, comprising:
(a) a monolithic housing block having intersecting first and second bores extending therethrough;
(b) a piston assembly slidably mounted in said first bore and selectively displaceable between predetermined limits;
(c) a rotor assembly mounted in said second bore and including first and second rotatable pinion gears;
(d) a slide member mounted on said monolithic block for movement axially thereon;
(e) means interposed between said rotor assembly and said slide member operative to effect axial displacement of the slide member in relation to said monolithic housing block when said piston assembly is displaced;

(f) means on said monolithic housing block for selectively delivering fluid to a selected end of said first bore to effect displacement of said piston assembly;

(g) a bearing block mounted in said first bore medianly of the opposite ends thereof and including a transverse semi-cylindrical notch in registry with the cylindrical configuration of said second bore whereby to accommodate said rotor assembly; and (h) a connector bar extending axially through said bearing block and slidable therein for axial displacement with said piston assembly.

14. The combination according to claim 13, in which a gear rack is provided on said connector bar meshing with said first pinion gear of said rotor assembly.

* * * * *